United States Patent
Lin

(10) Patent No.: US 8,049,533 B1
(45) Date of Patent: Nov. 1, 2011

(54) RECEIVER AND METHOD FOR DYNAMICALLY ADJUSTING SENSITIVITY OF RECEIVER

(75) Inventor: Shih-Chun Lin, Tainan County (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 12/759,355

(22) Filed: Apr. 13, 2010

(51) Int. Cl.
*H03K 19/094* (2006.01)
*H03B 1/00* (2006.01)

(52) U.S. Cl. .............. 326/82; 326/21; 326/29; 326/62; 326/83; 326/89; 327/108; 327/109; 327/110; 327/111; 327/112; 331/16; 331/17

(58) Field of Classification Search .............. 326/21–24, 326/29, 62, 82–87, 89–91; 327/108–112; 331/16–17
See application file for complete search history.

(56) References Cited

U.S. PATENT DOCUMENTS

| | | | | |
|---|---|---|---|---|
| 6,323,695 B1 * | 11/2001 | Heinrich | ......................... | 327/89 |
| 6,373,278 B1 * | 4/2002 | Sung et al. | ....................... | 326/38 |
| 6,392,452 B2 * | 5/2002 | Lee | ............................. | 327/108 |
| 7,667,546 B2 * | 2/2010 | Kim | ............................. | 331/16 |

\* cited by examiner

*Primary Examiner* — Shawki S Ismail
*Assistant Examiner* — Matthew C Tabler
(74) *Attorney, Agent, or Firm* — J.C. Patents

(57) ABSTRACT

A receiver and a method for dynamically adjusting sensitivity of the receiver are provided. The receiver includes a detection unit and a receiving unit. The detection unit detects an input signal group, and outputs a detection result. The receiving unit receives the input signal group according to a sensitivity. Wherein, the receiving unit dynamically adjusts the sensitivity used for receiving the input signal group according to the detection result of the detection unit.

19 Claims, 8 Drawing Sheets

RECEIVER AND METHOD FOR DYNAMICALLY ADJUSTING SENSITIVITY OF RECEIVER

BACKGROUND OF THE INVENTION

1. Field of the Invention

The present invention relates to a receiver. More particularly, the present invention relates to a receiver capable of dynamically adjusting sensitivity thereof and a method for dynamically adjusting sensitivity of the receiver.

2. Description of Related Art

A receiver can provide an interface, so that signals of a previous stage can be correctly transmitted to a next stage. When the signal of the previous stage is an abnormal input or a noise, an operation of a chip can be abnormal. For example, in a display device, a video scaler transmits a signal group containing a clock signal and a data signal to a timing controller according to a low voltage differential signalling (LVDS) technique. A receiver in the timing controller receives the signal group, and transmits the signal group to an internal circuit of the timing controller. When the input signal of the receiver is an abnormal input or a noise, the operation of the timing controller can be abnormal, so that the display device may display an abnormal image. To avoid the abnormal operation of the timing controller caused by the noise, in a conventional technique, a logic gate is used to determine the noise. However, the so-called noise is a random signal that cannot be predicted, which cannot be completely prevented according to a logical approach.

SUMMARY OF THE INVENTION

The present invention is directed to a receiver and a method for dynamically adjusting sensitivity of the receiver, by which a receiving sensitivity of the receiver can be dynamically adjusted, so as to filter a noise without decreasing a performance of the receiver.

The present invention provides a receiver comprising a detection unit and a receiving unit. The detection unit detects an input signal group and outputs a detection result. The receiving unit receives the input signal group according to a sensitivity. Wherein, the receiving unit dynamically adjusts the sensitivity used for receiving the input signal group according to the detection result of the detection unit.

The present invention provides a method for dynamically adjusting sensitivity of a receiver. The method can be described as follows. A phase of an input signal group is detected to output a detection result. The input signal group is received according to a sensitivity, and the sensitivity is dynamically adjusted according to the detection result.

According to the above descriptions, in the present invention, the detection unit is used to detect the input signal group, and then the receiving sensitivity of the receiving unit is dynamically adjusted according to the detection result. When the receiving unit receives a noise, the receiving sensitivity of the receiving unit is decreased to filter the noise, so as to avoid transmitting the noise to a next stage circuit. When the receiving unit receives a normal signal, the receiving sensitivity of the receiving unit is increased, so as to avoid decreasing a performance of the receiver.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
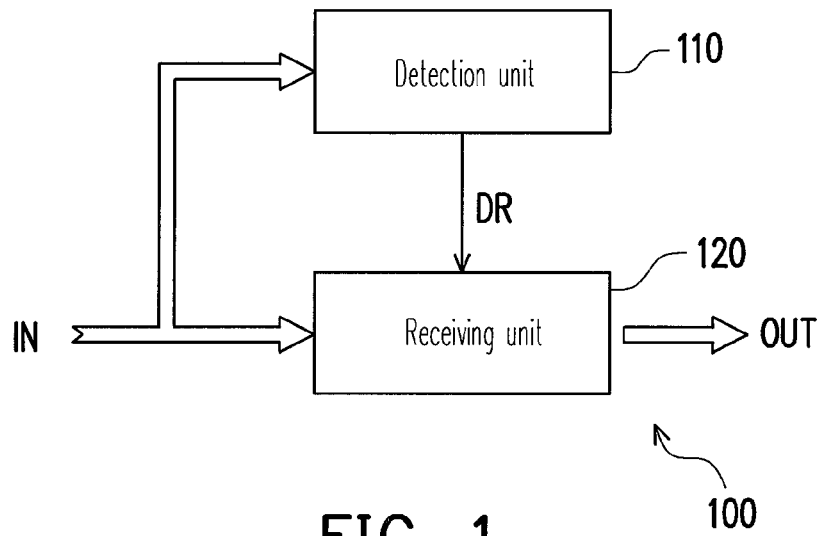
FIG. 1 is a functional block diagram illustrating a receiver 100 capable of dynamically adjusting sensitivity according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Generally, energy (or amplitude) of a noise is lower than that of a normal signal. To filter the noise, an input terminal of a receiver can be designed to have a low sensitivity, so that the noise cannot pass through the receiver, though the normal signal having larger energy can smoothly pass through the receiver. However, although such method can effectively filter the noise having smaller energy, a performance of the input terminal of the receiver is also decreased. Namely, a part of the normal signals having relatively small energy probably cannot be input to the receiver having the low sensitivity. Therefore, usage of the low sensitivity receiver can decrease a capability of tolerating errors of normal signals.

FIG. 1 is a functional block diagram illustrating a receiver 100 capable of dynamically adjusting sensitivity according to an embodiment of the present invention. The receiver 100 includes a detection unit 110 and a receiving unit 120. The detection unit 110 detects an input signal group IN, and outputs a detection result DR to the receiving unit 120. The receiving unit 120 receives the input signal group IN according to a sensitivity, and provides an output signal OUT to a next stage circuit (not shown). The receiving unit 120 dynamically adjusts the sensitivity according to the detection result DR of the detection unit 110. When the detection unit 110 detects that the input signal group IN is a noise, the receiving sensitivity of the receiving unit 120 is dynamically decreased to filter the noise, so as to avoid transmitting the noise to the next stage circuit. When the detection unit 110 detects that the input signal group IN is a normal signal, the receiving sensitivity of the receiving unit 120 is dynamically increased, so as to avoid decreasing a performance of the receiver 100.

Figure 2:
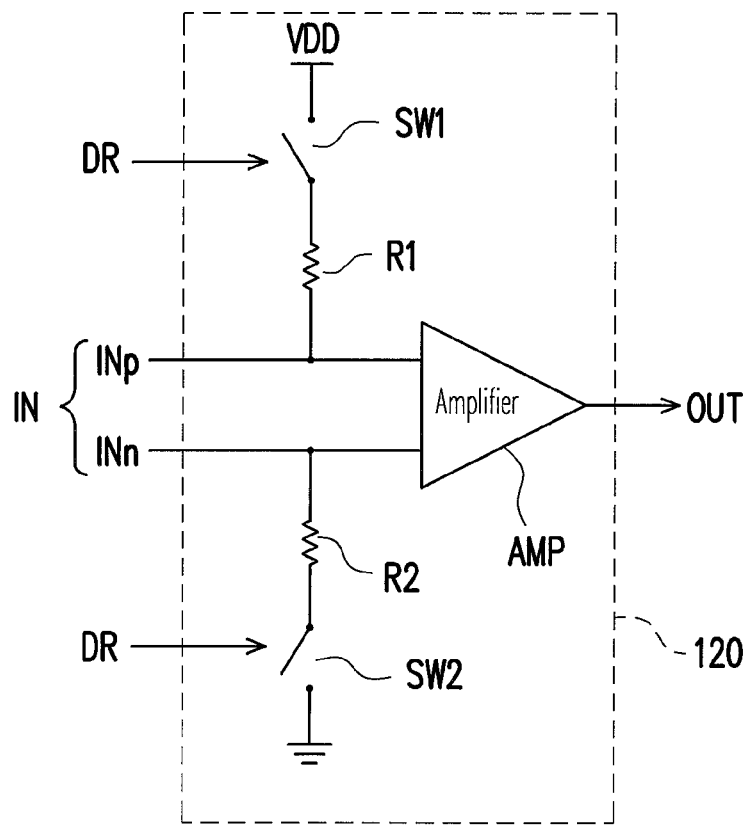
FIG. 2 is a functional block diagram illustrating a receiving unit of FIG. 1 according to an embodiment of the present invention.

FIG. 2 is a functional block diagram illustrating the receiving unit 120 of FIG. 1 according to an embodiment of the present invention. Here, the input signal group IN contains an input signal pair INp and INn. The receiving unit 120 includes an amplifier AMP, a first switch SW1, a second switch SW2, a first resistor R1 and a second resistor R2. A first input terminal and a second input terminal of the amplifier AMP respectively receive the input signal pair INp and INn. The first switch SW1 and the second switch SW2 are turned on/off in response to the detection result DR of the detection unit 110. The first resistor R1 and the first switch SW1 are connected in series between the first input terminal of the amplifier AMP and a first voltage (for example, a system voltage VDD). The second resistor R2 and the second switch SW2 are connected in series between the second input terminal of the amplifier AMP and a second voltage (for example, a ground voltage).

Generally, the normal signal has regularity, while the noise does not have the regularity. Therefore, if a phase of the input signal group IN can be locked, it represents that the input signal group IN is the normal signal. When the detection result DR indicates that the detection unit 110 does not lock the phase of the input signal group IN, the first switch SW1 and the second switch SW2 are turned on. Now, the first resistor R1 is a pull-up resistor and pulls up a common-mode voltage of the first input terminal of the amplifier AMP, and the second resistor R2 is a pull-down resistor and pulls down a common-mode voltage of the second input terminal of the amplifier AMP. Since the common-mode voltages of the first input terminal and the second input terminal of the amplifier AMP are pulled apart, the receiving sensitivity of the amplifier AMP can be dynamically decreased, so as to filter the noise.

When the detection result DR indicates that the detection unit 110 has locked the phase of the input signal group IN, the first switch SW1 and the second switch SW2 are turned off. Now, the first resistor R1 and the second resistor R2 do not pull apart the common-mode voltages of the first input terminal and the second input terminal of the amplifier AMP. Therefore, the amplifier AMP is dynamically adjusted back to a high sensitivity.

Figure 3:
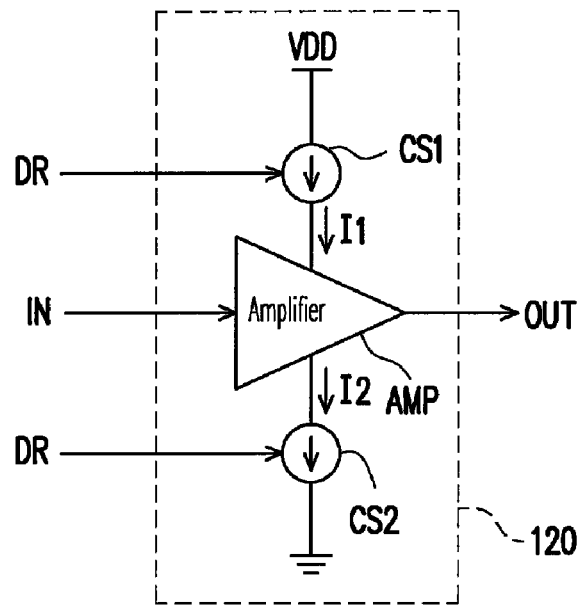
FIG. 3 is a functional block diagram illustrating a receiving unit of FIG. 1 according to another embodiment of the present invention.

FIG. 3 is a functional block diagram illustrating the receiving unit 120 of FIG. 1 according to another embodiment of the present invention. The receiving unit 120 include an amplifier AMP, a first current source CS1 and a second current source CS2. An input terminal of the amplifier AMP receives the input signal group IN, and an output terminal thereof provides an output signal OUT. The first current source CS1 determines a current amount of a first current I1 according to the detection result DR of the detection unit 110, and provides the first current I1 to a first supply end of the amplifier AMP. The second current source CS2 determines a current amount of a second current I2 according to the detection result DR, and provides the second current I2 to a second supply end of the amplifier AMP. The first current I1 and the second current I2 can provide necessary operation power for the amplifier AMP.

When the detection result DR indicates that the detection unit 110 does not lock the phase of the input signal group IN, the currents (i.e. the first current I1 and the second current I2) of the supply ends of the amplifier AMP are reduced. By reducing the currents of the supply ends, a gain of the amplifier AMP is correspondingly reduced, so that the sensitivity of the amplifier AMP is dynamically decreased. When the detection result DR indicates that the detection unit 110 has locked the phase of the input signal group IN, the currents of the supply ends of the amplifier AMP are increased. As the currents of the supply ends of the amplifier AMP are increased, the gain of the amplifier AMP is accordingly increased, so that the sensitivity of the amplifier AMP is dynamically increased.

In some other embodiments, the input signal group can also contain a clock signal CLKin and a data signal Din (for example, the input signal pair INp and INn). The detection unit 110 can detect the clock signal CLKin and outputs the detection result DR. The receiving unit 120 correspondingly adjusts the sensitivity according to the detection result DR, and receives the data signal Din according to the adjusted sensitivity. Implementation of the detection unit 110 is described below while taking "detecting the phase of the clock signal CLKin" as an example.

Figure 4:
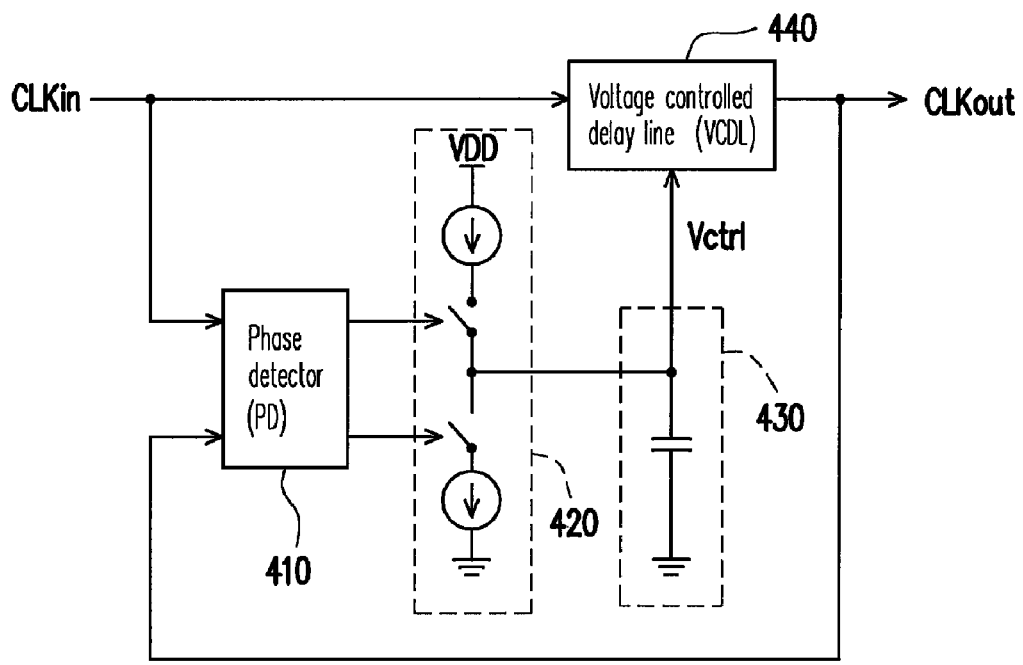
FIG. 4 is a functional block diagram illustrating a detection unit of FIG. 1 according to an embodiment of the present invention.

FIG. 4 is a functional block diagram illustrating the detection unit 110 of FIG. 1 according to an embodiment of the present invention. The detection unit 110 includes a delay locked loop (DLL), and the DLL includes a phase detector (PD) 410, a charge pump (CP) 420, a low-pass filter (LPF) 430 and a voltage controlled delay line (VCDL) 440. The PD 410 receives and compares phases of the clock signals CLKin and CLKout. The CP 420 correspondingly charges or discharges the LPF 430 according to a comparison result of the PD 410. Therefore, the LPF 430 can provide a delay control voltage Vctrl to the VCDL 440. The VCDL 440 correspondingly delays the clock signal CLKin according to the delay control voltage Vctrl, and outputs the delayed clock signal CLKin to serve as the clock signal CLKout. The above DLL is a well-known technique, and therefore a detail description thereof is not repeated. When the DLL locks the clock signal CLKin, the delay control voltage Vctrl approaches a certain predetermined voltage, and the phase of the clock signal CLKout also approaches a certain predetermined phase. Therefore, in some other embodiments, the detection unit 110 can output the delay control voltage Vctrl of the VCDL 440 or the clock signal CLKout to serve as the detection result DR.

Figure 5:
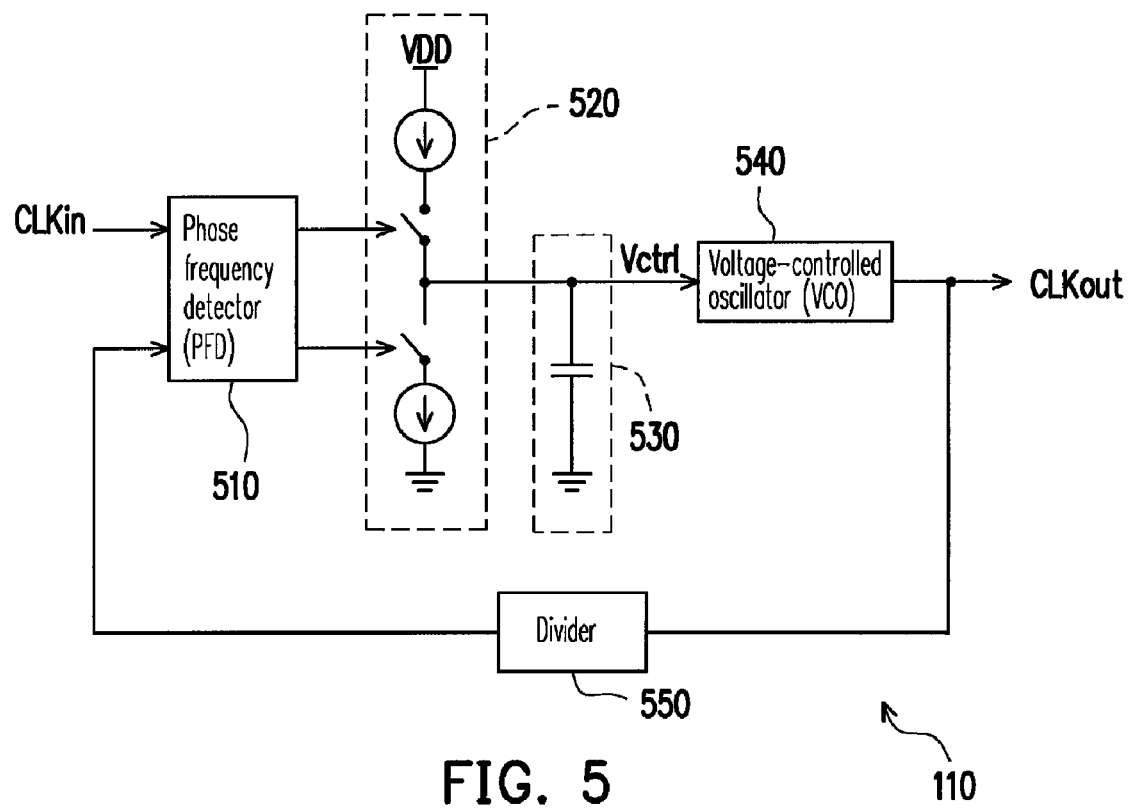
FIG. 5 is a functional block diagram illustrating a detection unit of FIG. 1 according to another embodiment of the present invention.

FIG. 5 is a functional block diagram illustrating the detection unit 110 of FIG. 1 according to another embodiment of the present invention. The detection unit 110 includes a phase locked loop (PLL), and the PLL includes a phase frequency detector (PFD) 510, a CP 520, a LPF 530, a voltage-controlled oscillator (VCO) 540 and a divider 550. The PFD 510 receives and compares phases and frequencies of the clock signal CLKin and a feedback clock CLKfb. The CP 520 correspondingly charges or discharges the LPF 530 according to a comparison result of the PFD 510. Therefore, the LPF 530 can provide a frequency control voltage Vctrl to the VCO 540. The VCO 540 correspondingly generates a clock signal CLKout in response to the frequency control voltage Vctrl. The divider 550 divides a frequency of the clock signal CLKout, and outputs the frequency-divided clock signal CLKout to the PFD 510 to serve as the feedback clock CLKfb. The above PLL is a well-known technique, so that a detailed description thereof is not repeated. The frequency output by the PLL can be varied along with a magnitude of the frequency control voltage Vctrl. When the PLL locks the clock signal CLKin, the frequency control voltage Vctrl approaches a certain predetermined voltage, and the frequency of the clock signal CLKout also approaches a certain predetermined frequency. Therefore, in some other embodiments, the detection unit 110 can output the frequency control voltage Vctrl of the VCO 540 or the clock signal CLKout to serve as the detection result DR.

Figure 6:
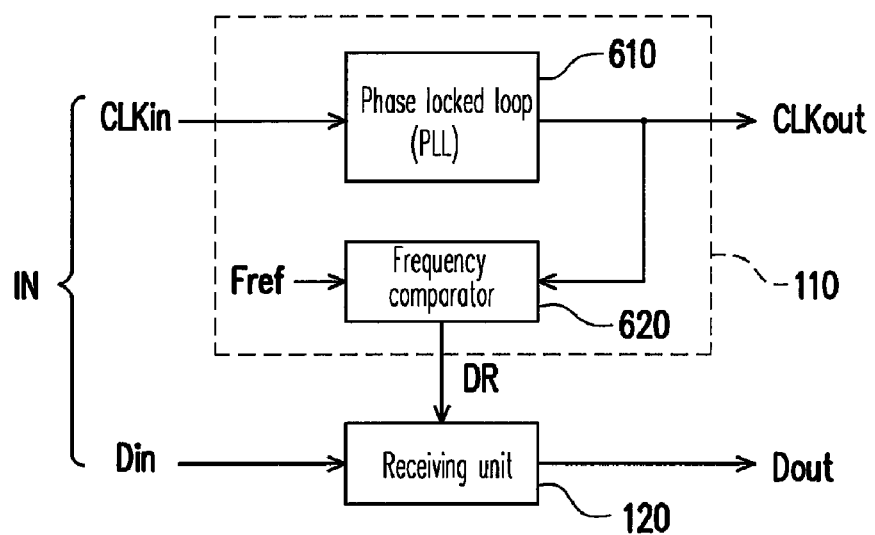
FIG. 6 is a functional block diagram illustrating a detection unit of FIG. 1 according to still another embodiment of the present invention.

FIG. 6 is a functional block diagram illustrating the detection unit 110 of FIG. 1 according to still another embodiment of the present invention. The detection unit 110 includes a PLL 610 and a frequency comparator 620. The PLL 610 is the same to the PLL of FIG. 5. The frequency comparator 620 is connected to an output terminal of the PLL 610. If the phase of the clock signal CLKin can be locked, it represents that the input signal group IN is a normal signal. When the PLL 610 locks the clock signal CLKin, the frequency of the output clock signal CLKout of the PLL 610 is fixed. Therefore, the frequency comparator 620 compares the frequency of the output clock signal CLKout with a reference frequency Fref. Then, the frequency comparator 620 transmits a comparison result to the receiving unit 120 to serve as the detection result DR.

Figure 7:
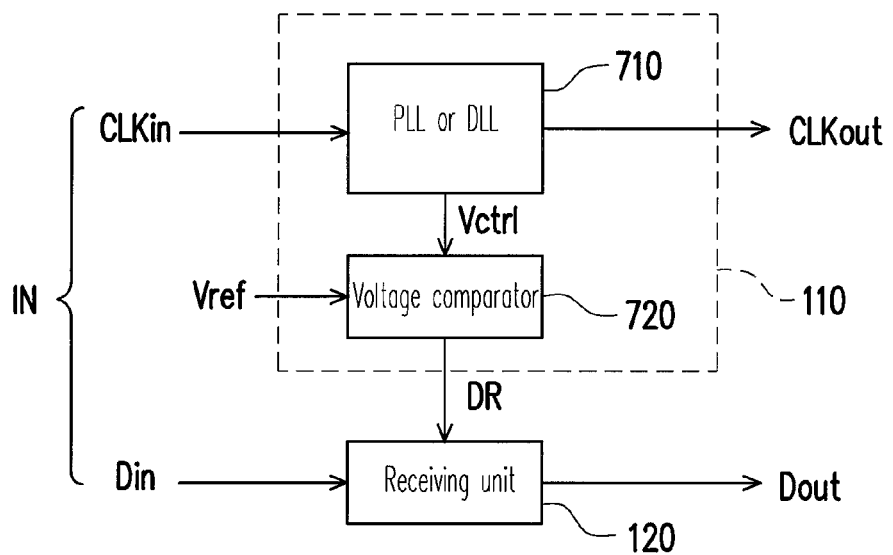
FIG. 7 is a functional block diagram illustrating a detection unit of FIG. 1 according to yet another embodiment of the present invention.

FIG. 7 is a functional block diagram illustrating the detection unit 110 of FIG. 1 according to yet another embodiment of the present invention. The detection unit 110 includes a PLL (or a DLL) 710 and a voltage comparator 720. If 710 is a PLL, the PLL of FIG. 5 can be referred to implement the PLL 710, and the frequency control voltage Vctrl of the VCO 540 is output to the voltage comparator 720. IF 710 is a DLL, the DLL of FIG. 4 can be referred to implement the DLL 710, and the delay control voltage Vctrl of the VCDL 440 is output to the voltage comparator 720.

Figure 8:
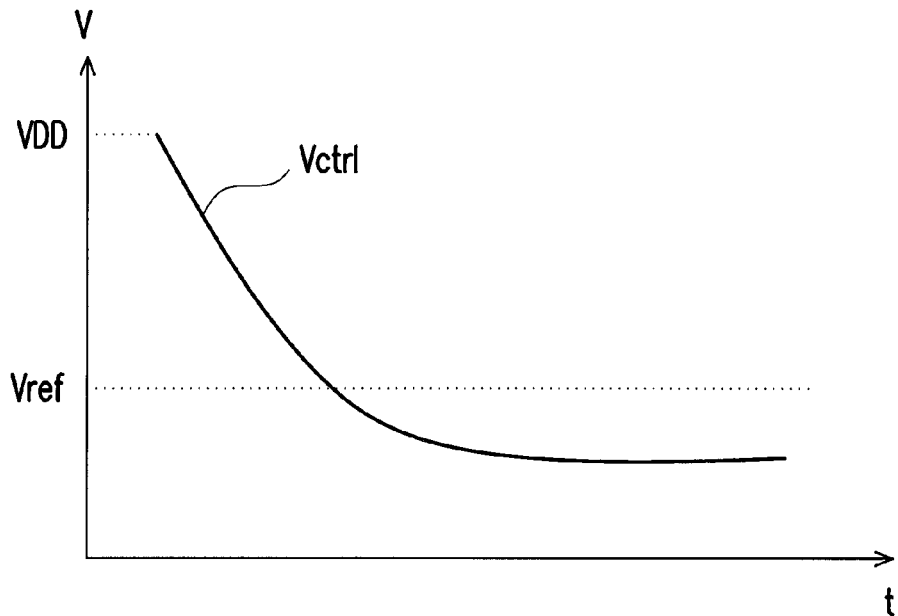
FIG. 8 is a timing diagram of a control voltage Vctrl and a reference voltage Vref within a PLL (or a DLL) according to an embodiment of the present invention.

FIG. 8 is a timing diagram of a control voltage Vctrl and a reference voltage Vref within the PLL (or the DLL) according to an embodiment of the present invention. During a signal locking process of the PLL (or the DLL), the control voltage Vctrl is slowly decreased from the system voltage VDD, and when the locking process is completed, the control voltage Vctrl is fixed to a certain voltage value. Then, the voltage comparator 720 compares the frequency control voltage (or the delay control voltage) Vctrl with the reference voltage Vref. When the control voltage Vctrl is less than the reference voltage Vref, the detection unit 110 determines that the PLL (or the DLL) has a locking state, and transmits the comparison result to the receiving unit 120 to serve as the detection result DR.

Figure 9:
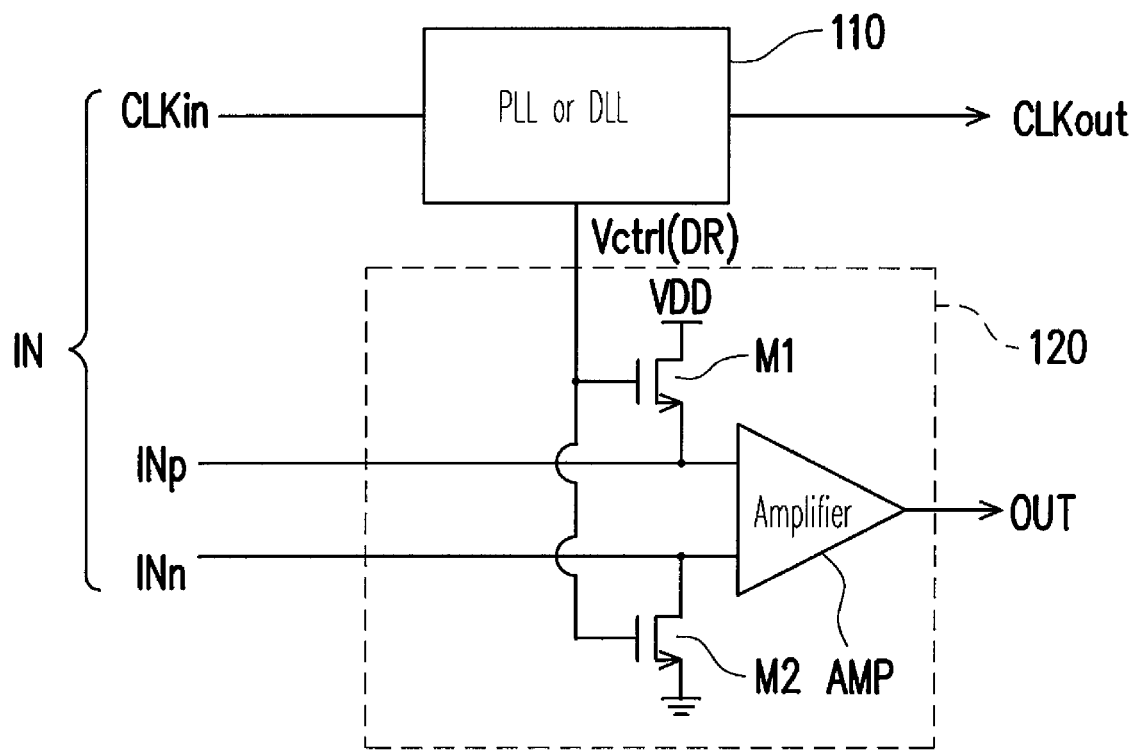
FIG. 9 is a functional block diagram illustrating a receiving unit of FIG. 1 according to still another embodiment of the present invention.

FIG. 9 is a functional block diagram illustrating the receiving unit 120 of FIG. 1 according to still another embodiment of the present invention. In the present embodiment, the detection unit 110 can be a PLL or a DLL. The detection result DR can be the frequency control voltage Vctrl of the VCO 540 within the PLL (shown in FIG. 5), or the delay control voltage Vctrl of the VCDL 440 within the DLL (shown in FIG. 4).

The receiving unit 120 includes an amplifier AMP, a first transistor M1 and a second transistor M2. The transistors M1 and M2 can be NMOS transistors or other types of transistors. A first input terminal and a second input terminal of the amplifier AMP receive the input signal pair INp and INn of the input signal group IN. Control terminals of the transistors M1 and M2 receive the detection result DR (i.e. the control voltage Vctrl). A first terminal of the first transistor M1 is connected to the first input terminal of the amplifier AMP, and a second terminal of the first transistor M1 is connected to a first voltage (for example, the system voltage VDD). A first terminal of the second transistor M2 is connected to the second input terminal of the amplifier AMP, and a second terminal of the second transistor M2 is connected to a second voltage (for example, the ground voltage). When the control voltage Vctrl is increased, resistances of the NMOS transistors M1 and M2 are decreased, and the sensitivity of the amplifier AMP is decreased. When the control voltage Vctrl is decreased, the resistances of the NMOS transistors M1 and M2 are increased, and the sensitivity of the amplifier AMP is increased.

Figure 10:
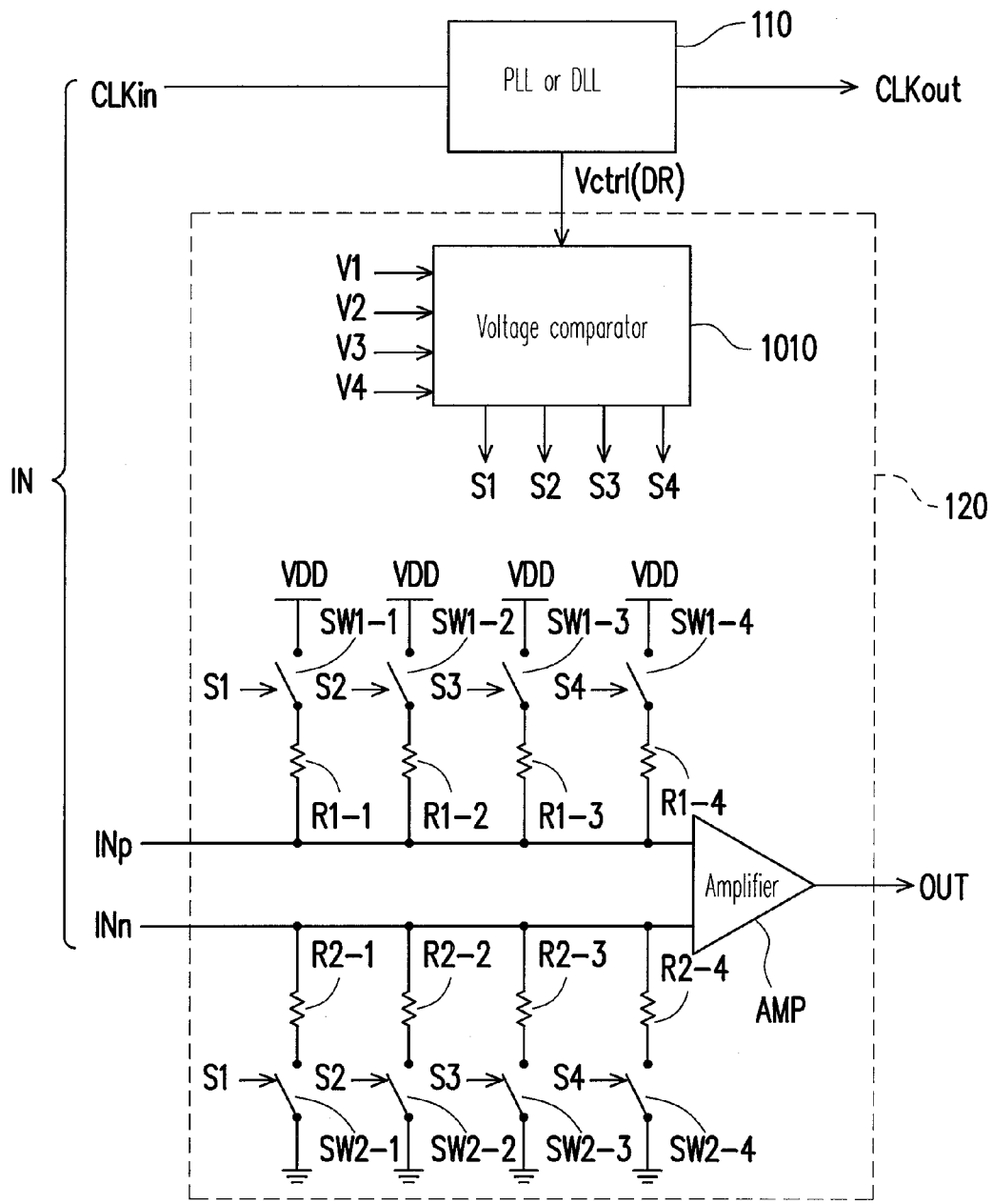
FIG. 10 is a functional block diagram illustrating a receiving unit of FIG. 1 according to yet another embodiment of the present invention.
Figure 11:
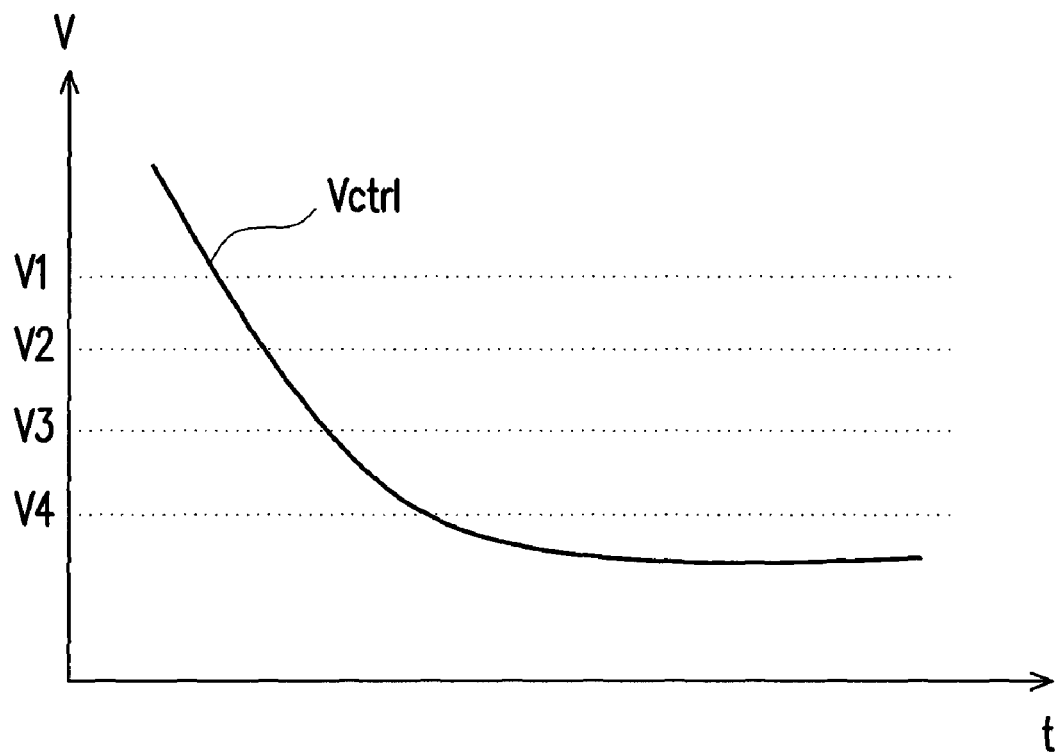
FIG. 11 is a timing diagram of a control voltage and a reference voltage within a PLL (or a DLL) of FIG. 10 according to an embodiment of the present invention.

FIG. 10 is a functional block diagram illustrating the receiving unit 120 of FIG. 1 according to yet another embodiment of the present invention. FIG. 11 is a timing diagram of a control voltage Vctrl and a reference voltage Vref within the PLL (or the DLL) of FIG. 10 according to an embodiment of the present invention. In the present embodiment, the detection unit 110 can be a PLL or a DLL. The detection result DR can be the frequency control voltage Vctrl of the VCO 540 within the PLL (shown in FIG. 5), or the delay control voltage Vctrl of the VCDL 440 within the DLL (shown in FIG. 4). The receiving unit 120 includes a voltage comparator 1010, an amplifier AMP, at least one first switch, at least one first resistor, at least one second switch and at least one second resistor. The voltage comparator 1010 is connected to the detection unit 110 for receiving the detection result DR (i.e. the control voltage Vctrl). The voltage comparator 1010 compares a voltage of the detection result DR with at least one reference voltage, and outputs a comparison result.

Numbers of the reference voltages, the first switches, the first resistors, the second switches and the second resistors are determined according to a design requirement. In the present embodiment, four first switches SW1-1, SW1-2, SW1-3 and SW1-4, four first resistors R1-1, R1-2, R1-3 and R1-4, four second switches SW2-1, SW2-2, SW2-3 and SW2-4, and four second resistors R2-1, R2-2, R2-3 and R2-4 are used as an example. Moreover, in the present embodiment, four reference voltages V1, V2, V3 and V4 of different levels are used as an example, as that shown in FIG. 11.

The first input terminal and the second input terminal of the amplifier AMP receive the input signal pair INp and INn of the input signal group IN. The first resistors and the first switches are connected in series between the first input terminal of the amplifier AMP and the first voltage (for example, the system voltage VDD). For example, the first resistor R1-1 and the first switch SW1-1 are connected in series between the first input terminal of the amplifier AMP and the system voltage VDD, and connections of the other first resistors R1-2~R1-4 and the other first switches SW1-2~SW1-4 are deduced by analogy. The second resistors and the second switches are connected in series between the second input terminal of the amplifier AMP and the second voltage (for example, the ground voltage). For example, the second resistor R2-1 and the second switch SW2-1 are connected in series between the second input terminal of the amplifier AMP and the ground voltage, and connections of the other second resistors R2-2~R2-4 and the other second switches SW2-2~SW2-4 are deduced by analogy.

The voltage comparator 1010 compares the control voltage Vctrl with the reference voltages V1-V4, and outputs comparison results S1, S2, S3 and S4. The first switch SW1-1 and the second switch SW2-1 are turned on/off in response to the comparison result S1. The first switch SW1-2 and the second switch SW2-2 are turned on/off in response to the comparison result S2. The first switch SW1-3 and the second switch SW2-3 are turned on/off in response to the comparison result S3. The first switch SW1-4 and the second switch SW2-4 are turned on/off in response to the comparison result S4. When the control voltage Vctrl is greater than the reference voltage V1, the voltage comparator 1010 outputs the comparison results S1, S2, S3 and S4 to turn on all of the first switches SW1-1~SW1-4 and all of the second switches SW2-1~SW2-

4. Now, resistances of the pull-up resistor and the pull-down resistor are the minimum, i.e. a difference between the common-mode voltage of the first input terminal and the common-mode voltage of the second input terminal of the amplifier AMP is the maximum, so that the sensitivity is the worst.

When the control voltage Vctrl is between the reference voltage V1 and the reference voltage V2 (i.e. V1>Vctrl>V2), the voltage comparator 1010 outputs the comparison results S1, S2, S3 and S4 to turn off the first switch SW1-4 and the second switch SW2-4, and turn on the other first switches SW1-1~SW1-3 and the other second switches SW2-1~SW2-3. When the control voltage Vctrl is between the reference voltage V2 and the reference voltage V3 (i.e. V2>Vctrl>V3), the voltage comparator 1010 outputs the comparison results S1, S2, S3 and S4 to turn off the first switches SW1-3~SW1-4 and the second switches SW2-3~SW2-4, and turn on the first switches SW1-1~SW1-2 and the second switches SW 2-1~SW2-2. When the control voltage Vctrl is between the reference voltage V3 and the reference voltage V4 (i.e. V3>Vctrl>V4), the voltage comparator 1010 outputs the comparison results S1, S2, S3 and S4 to turn off the first switches SW1-2~SW1-4 and the second switches SW2-2~SW2-4, and turn on the first switch SW1-1 and the second switch SW 2-1.

When the control voltage Vctrl is less than the reference voltage V4, all of the first switches SW1-1~SW1-4 and all of the second switches SW2-1~SW2-4 are turned off. Now, resistances of the pull-up resistor and the pull-down resistor are the maximum, i.e. the difference between the common-mode voltage of the first input terminal and the common-mode voltage of the second input terminal of the amplifier AMP is the minimum, so that the sensitivity is the best. Therefore, in the embodiment of FIG. 10, the sensitivity of the amplifier AMP can be gradually increased according to signal locking degrees.

Figure 12:
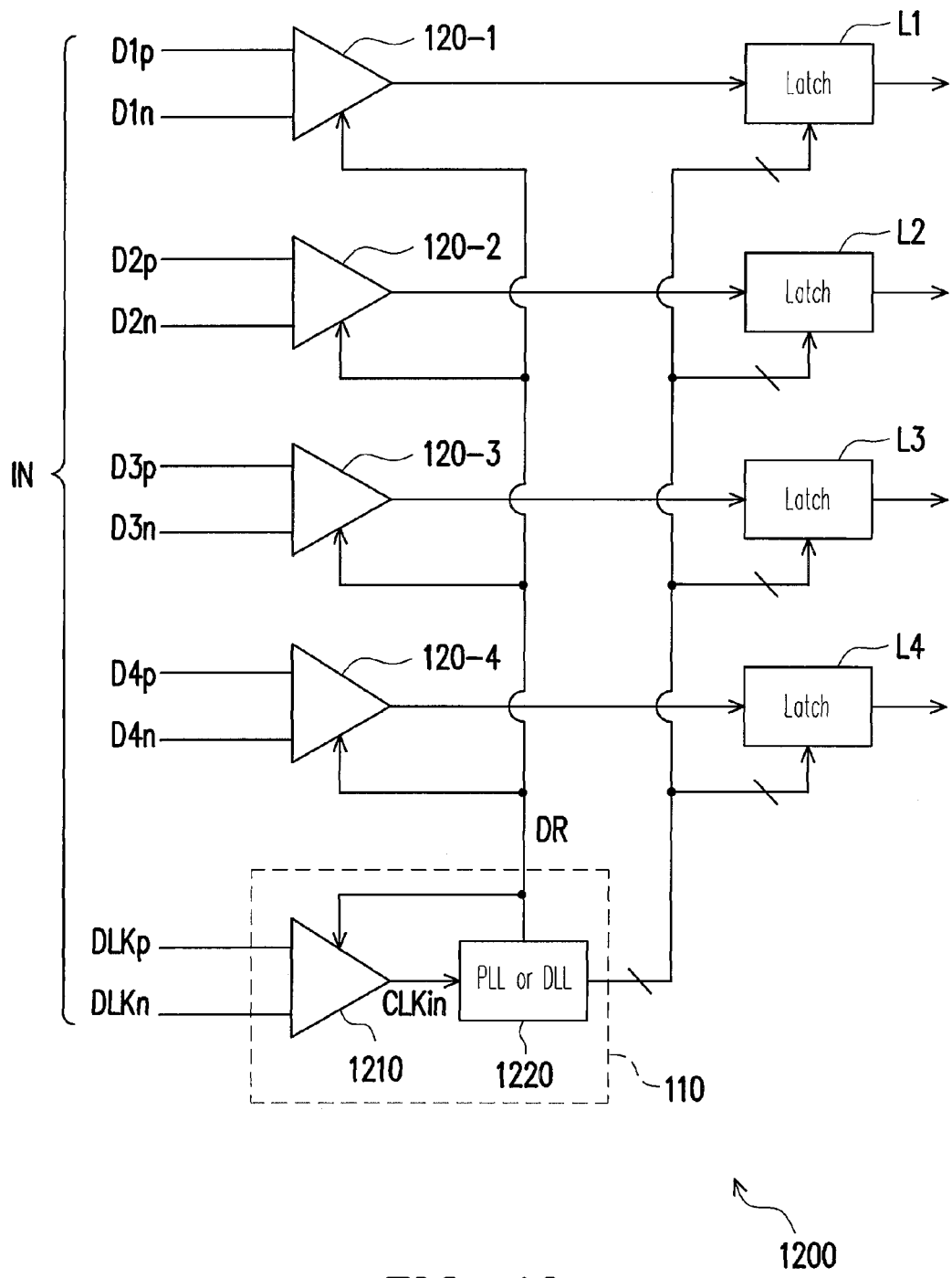
FIG. 12 is a functional block diagram illustrating a receiver of FIG. 1 applied to low voltage differential signals (LVDSs).

Taking low voltage differential signals (LVDSs) as an example, FIG. 12 is a functional block diagram illustrating a receiver of FIG. 1 applied to the LVDSs. The receiver 1200 includes a detection unit 110, four receiving units 120-1, 120-2, 120-3 and 120-4, and fourth latches L1, L2, L3 and L4. The input signal group IN includes a first data signal pair D1p and D1n, a second data signal pair D2p and D2n, a third data signal pair D3p and D3n, a fourth data signal pair D4p and D4n, and a clock signal pair CLKp and CLKn.

The receiving units 120-1~120-4 respectively receive the corresponding data signal pairs [D1p, D1n]~[D4p, D4n]. Sensitivities of the receiving units 120-1~420-4 can be adjusted according to the detection result DR output from the detection unit 110. The receiving units 120 of the aforementioned embodiments can be referred for implementation of the receiving units 120-1-120-4. Input terminals of the latches L1-L4 respectively receive the corresponding outputs of the receiving units 120-1-120-4, and latch the outputs of the receiving units 120-1~120-4 according to the clock signal output from the detection unit 110.

The detection unit 110 includes an amplifier 1210 and a DLL (or PLL) 1220. A receiving sensitivity of the amplifier 1210 is also determined according to the detection result DR. The receiving units 120 of the aforementioned embodiments can be referred to implement the amplifier 1210. The amplifier 1210 receives the clock signals CLKp and CLKn, and outputs a clock signal CLKin to the DLL (or PLL) 1220. The detection units 110 of the aforementioned embodiments can be referred to implement the DLL (or PLL) 1220. An input terminal of the DLL (or PLL) 1220 is connected to an output terminal of the amplifier 1210. The DLL (or PLL) 1220 locks the phase of the clock signal CLKin, and provides the detection result DR to the receiving units 120-1~120-4 and the amplifier 1210, so as to dynamically adjust the sensitivities of the receiving units 120-1~120-4 and the amplifier 1210.

A method for dynamically adjusting the sensitivity of the receiver is described below, which includes following steps. The phase of the input signal group IN is detected to output the detection result DR. The input signal group IN is received according to a sensitivity, and the sensitivity is dynamically adjusted according to the detection result DR. In case that the input signal group IN includes a clock signal and a data signal, the step of detecting the phase of the input signal group IN includes detecting a phase of the clock signal, so as to output the detection result DR, and the step of receiving the input signal group IN according to the sensitivity includes receiving the data signal according to the sensitivity.

In summary, when the input terminal of the receiving unit 120 does not receive an input signal or is in a floating state, the input terminal of the receiving unit 120 probably receive different kinds of noises. Now, since the input signal group IN is the noise, the detection unit 110 (for example, the PLL or the DLL) cannot perform the locking process. Therefore, the sensitivity of the receiving unit 120 is dynamically adjusted to a low sensitivity. Since the sensitivity of the receiving unit 120 is decreased, most of the noise can be filtered. Taking the embodiment of FIG. 12 as an example, there are two conditions to achieve the locking state of the PLL (or DLL) 1220. 1. the input clock signal must have relatively great energy, so as to pass through the amplifier 1210 having the low sensitivity; 2. the input clock signal has to be maintained to a fixed frequency, so as to achieve the locking state of the PLL (or DLL) 1220. Once the frequency of the input clock signal is changed, the PLL (or DLL) 1220 is recovered to an unlocking state. Therefore, when the normal clock signal is input, since the clock signal has relatively great energy and the frequency thereof is fixed, the clock signal can be input to the PLL (or DLL) 1220 through the amplifier 1210, so that the PLL (or DLL) 1220 can lock the clock signal. Now, the sensitivities of amplifier 1210 and the receiving units 120-1~120-4 can be adjusted to high sensitivities, so that attenuation of the input data IN due to inadequate performance of the amplifier is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A receiver, comprising:
    a detection unit, detecting whether an input signal group is a noise, and outputting a detection result; and
    a receiving unit, receiving the input signal group according to a sensitivity, wherein the sensitivity determines the amount of the input signal group that passes through the receiving unit, and the receiving unit dynamically adjusts the sensitivity according to the detection result of the detection unit;
    wherein the receiving unit comprises:
    an amplifier, having a first input terminal and a second input terminal receiving the input signal group;
    a first switch, being turned on/off according to the detection result;
    a first resistor, the first switch and the first resistor being connected in series between the first input terminal of the amplifier and a first voltage;

a second switch, being turned on/off according to the detection result; and a second resistor, the second switch and the second resistor being connected in series between the second input terminal of the amplifier and a second voltage.

2. The receiver as claimed in claim 1, wherein the sensitivity is dynamically decreased when the input signal group is the noise, and the sensitivity is dynamically increased when the input signal group is a normal signal.

3. The receiver as claimed in claim 1, wherein the receiving unit comprises:
   an amplifier, having an input terminal receiving the input signal group;
   a first current source, determining a current amount of a first current according to the detection result, and providing the first current to a first supply end of the amplifier; and
   a second current source, determining a current amount of a second current according to the detection result, and providing the second current to a second supply end of the amplifier.

4. The receiver as claimed in claim 1, wherein the receiving unit comprises:
   an amplifier, having a first input terminal and a second input terminal receiving the input signal group;
   a first transistor, having a control terminal receiving the detection result, a first terminal coupled to the first input terminal of the amplifier, and a second terminal coupled to a first voltage; and
   a second transistor, having a control terminal receiving the detection result, a first terminal coupled to the second input terminal of the amplifier, and a second terminal coupled to a second voltage.

5. The receiver as claimed in claim 1, wherein the receiving unit comprises:
   a voltage comparator, connected to the detection unit for receiving the detection result, comparing a voltage value of the detection result with at least one reference voltage, and outputting a comparison result;
   an amplifier, having a first input terminal and a second input terminal receiving the input signal group;
   at least one first switch, being turned on/off according to the comparison result;
   at least one first resistor, the first switch and the first resistor being connected in series between the first input terminal of the amplifier and a first voltage;
   at least one second switch, being turned on/off according to the comparison result; and
   at least one second resistor, the second switch and the second resistor being connected in series between the second input terminal of the amplifier and a second voltage.

6. The receiver as claimed in claim 1, wherein the input signal group comprises a clock signal and a data signal, the detection unit detects the clock signal to output the detection result, and the receiving unit receives the data signal according to the sensitivity.

7. The receiver as claimed in claim 6, wherein the detection unit comprises a delay locked loop (DLL), and the DLL receives the clock signal.

8. The receiver as claimed in claim 7, wherein the detection result is a delay control voltage of a voltage controlled delay line (VCDL) in the DLL.

9. The receiver as claimed in claim 7, wherein the detection unit further comprises:
   a voltage comparator, connected to the DLL, for receiving a delay control voltage of a VCDL in the DLL, comparing the delay control voltage with a reference voltage, and transmitting a comparison result to the receiving unit to serve as the detection result.

10. The receiver as claimed in claim 6, wherein the detection unit comprises a phase locked loop (PLL), and the PLL receives the clock signal.

11. The receiver as claimed in claim 10, wherein the detection result is a frequency control voltage of a voltage-controlled oscillator (VCO) in the PLL.

12. The receiver as claimed in claim 10, wherein the detection unit further comprises:
   a frequency comparator, connected to an output terminal of the PLL, for comparing a frequency of an output signal of the PLL with a reference frequency, and transmitting a comparison result to the receiving unit to serve as the detection result.

13. The receiver as claimed in claim 10, wherein the detection unit further comprises:
   a voltage comparator, connected to the PLL, for receiving a frequency control voltage of a VCO in the PLL, comparing the frequency control voltage with a reference voltage, and transmitting a comparison result to the receiving unit to serve as the detection result.

14. The receiver as claimed in claim 1, wherein the input signal group comprises a clock signal and a data signal, the receiving unit receives the data signal according to the sensitivity, and the detection unit comprises:
   an amplifier, receiving the clock signal according to the sensitivity; and
   a DLL, having an input terminal connected to an output terminal of the amplifier,
   wherein the DLL provides the detection result to the receiving unit and the amplifier, so as to dynamically adjust the sensitivity.

15. The receiver as claimed in claim 1, wherein the input signal group comprises a clock signal and a data signal, the receiving unit receives the data signal according to the sensitivity, and the detection unit comprises:
   an amplifier, receiving the clock signal according to the sensitivity; and
   a PLL, having an input terminal connected to an output terminal of the amplifier,
   wherein the PLL provides the detection result to the receiving unit and the amplifier, so as to dynamically adjust the sensitivity.

16. A method for dynamically adjusting sensitivity of a receiver, comprising:
   detecting a phase of an input signal group to determine whether the input signal group is a noise, and outputting a detection result;
   receiving the input signal group according to a sensitivity, wherein the sensitivity determines the amount of the input signal group that passes through the receiving unit; and
   dynamically adjusting the sensitivity according to the detection result;
   wherein the step of dynamically adjusting the sensitivity comprises:
   pulling apart common-mode voltages of a first input terminal and a second input terminal of an amplifier when the phase of the input signal group is not locked; and
   do not pull apart the common-mode voltages of the first input terminal and the second input terminal of the amplifier when the phase of the input signal group has been locked.

17. The method for dynamically adjusting the sensitivity of the receiver as claimed in claim 16, wherein the step of dynamically adjusting the sensitivity comprises:
- decreasing a current of a supply end of an amplifier when the phase of the input signal group is not locked; and
- increasing the current of the supply end of the amplifier when the phase of the input signal group has been locked.

18. The method for dynamically adjusting the sensitivity of the receiver as claimed in claim 16, wherein the input signal group comprises a clock signal and a data signal, the step of detecting the phase of the input signal group comprises detecting a phase of the clock signal to output the detection result, and the step of receiving the input signal group according to the sensitivity comprises receiving the data signal according to the sensitivity.

19. The method for dynamically adjusting the sensitivity of the receiver as claimed in claim 16, further comprises
- dynamically decreasing the sensitivity when the input signal group is the noise; and
- dynamically increasing the sensitivity when the input signal group is a normal signal.

\* \* \* \* \*